J. B. WINCHELL & J. W. HÄUSER.
Vehicle Sand-Bands.

No. 208,658. Patented Oct. 1, 1878.

WITNESSES:
C. Neveux
C. Sedgwick

INVENTOR:
J. B. Winchell
J. W. Häuser
BY Munn & Co.
ATTORNEYS.

UNITED STATES PATENT OFFICE.

JAMES B. WINCHELL AND JOSEPH W. HÄUSER, OF ST. JOSEPH, MICHIGAN.

IMPROVEMENT IN VEHICLE SAND-BANDS.

Specification forming part of Letters Patent No. 208,658, dated October 1, 1878; application filed June 3, 1878.

*To all whom it may concern:*

Figure 1:
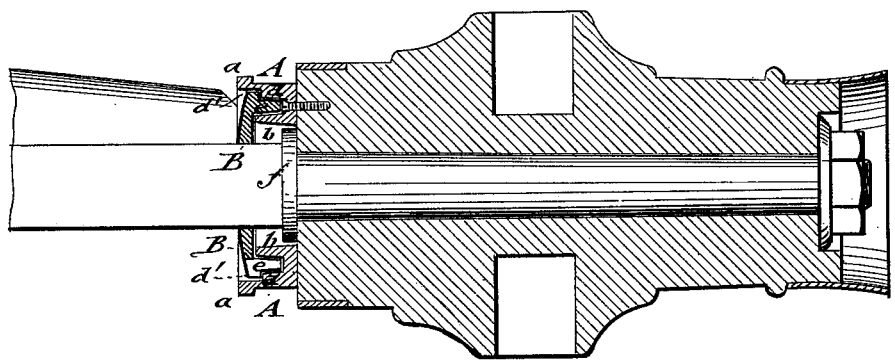
Figure 2:
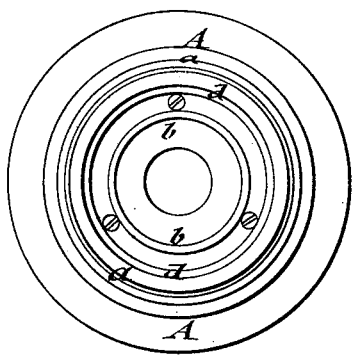
Figure 3:
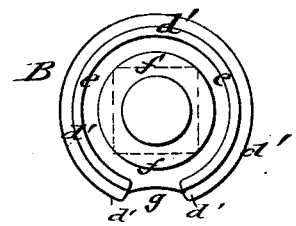

Be it known that we, JAMES B. WINCHELL and JOSEPH W. HÄUSER, of St. Joseph, in the county of Berrien and State of Michigan, have invented a new and Improved Sand-Guard for Vehicle-Axles, of which the following is a specification:

In the accompanying drawing, Figure 1 represents a vertical longitudinal section of a vehicle-axle and wheel-hub with our improved sand-guard. Fig. 2 is an end view of the cap-section of the guard attached to the hub, and Fig. 3 an end view of the flanged collar-section applied to the axle.

Similar letters of reference indicate corresponding parts.

This invention is intended to improve the sand-guard for vehicle-axles for which Letters Patent have been granted heretofore to J. B. Winchell, bearing, respectively, date of November 4, 1873, and September 22, 1874, so that a more effective dust-guard is obtained.

The invention will first be described in connection with the drawing, and then pointed out in the claim.

Referring to the drawing, A represents a tubular cap, that is attached to the inner or butt end of a hub, and which is constructed with a larger exterior flange, *a*, and with a shorter interior flange, *b*. The exterior flange, *a*, is turned out at the inside, so as to form an annular shoulder or seat, *d*, on which the circumferential rim *d'* of a tubular collar or section, B, of the axle is fitted. The axle-collar B is provided, inside of the circumferential rim *d*, with a smaller flange or collar, *e*, that fits into the space between the flanges of the cap A of the hub. A smaller collar or disk, *f*, is placed on the axle in front of the collar-section B, and made of such diameter as to fit closely into the interior of the inner flange of the cap-section of the hub.

The collar-section may be made in one or two pieces, as desired, and either made fast upon the axle of the vehicle, as in case of lighter carriages, or applied to the thimble-skeins used in heavy vehicles. In this manner a threefold joint of the collar of the axle with the cap of the hub is obtained—first, by the contact of the circumferential rim of the collar with the seat of the exterior flange of the cap; secondly, by the fitting of the flange of the collar-section into the space between the flanges of the cap; and, lastly, by the fitting of the smaller collar into the inside of the inner flange of the cap. In this manner a perfect dust guard or protector is formed between the hub and axle, that prevents the entrance of dust, sand, or dirt.

The guard may be used for light and heavy vehicles, and the collar and the axle provided at the bottom edge with a small recess, *g*, through which any dust or dirt that may get in may escape to the outside, so as not to fill up or clog the interior of the guard.

Having thus described our invention, we claim as new and desire to secure by Letters Patent—

A sand-guard for vehicle-axles, consisting of a cap attached to the inner end of the hub, and having two flanges, of which the outer flange has an annular seat, in connection with a collar-section of the axle, having circumferential rim, flange, and smaller collar, so as to form an intimate contact-joint of cap and axle-collar, substantially as set forth.

JAMES BERNARD WINCHELL.
JOSEPH WILHELM HÄUSER.

Witnesses:
    H. C. ROCKWELL,
    EMMA NOLLER.